US009551383B2

United States Patent

Fukuda et al.

(10) Patent No.: US 9,551,383 B2
(45) Date of Patent: Jan. 24, 2017

(54) TRANSAXLE

(71) Applicant: KANZAKI KOKYUKOKI MFG. CO., LTD., Amagasaki-shi (JP)

(72) Inventors: Toshiyuki Fukuda, Amagasaki (JP); Michio Tsukamoto, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 14/735,795

(22) Filed: Jun. 10, 2015

(65) Prior Publication Data

US 2015/0362059 A1 Dec. 17, 2015

(30) Foreign Application Priority Data

Jun. 13, 2014 (JP) ................................ 2014-122903

(51) Int. Cl.
*F16D 13/58* (2006.01)
*B60K 17/34* (2006.01)
*B60K 17/35* (2006.01)

(52) U.S. Cl.
CPC ............... *F16D 13/58* (2013.01); *B60K 17/34* (2013.01); *B60K 17/35* (2013.01); *Y10T 74/2186* (2015.01)

(58) Field of Classification Search
CPC ........ F16H 57/021; F16H 57/039; F16H 1/14; F16H 2057/0213; Y10T 74/2186; F16D 13/58; B60K 17/34; B60K 17/35
See application file for complete search history.

(56) References Cited

U.S. PATENT DOCUMENTS 6,293,890 B1 * 9/2001 Kaku ...................... F16H 48/08 188/71.5

FOREIGN PATENT DOCUMENTS

JP 2000-289588 A 10/2000

* cited by examiner

*Primary Examiner* — Thomas Diaz
(74) *Attorney, Agent, or Firm* — Sterne, Kessler, Goldstein & Fox P.L.L.C.

(57) ABSTRACT

A transaxle includes an input shaft, a brake, an output shaft, a mechanical transmission, a transaxle casing, and a spacing system. The brake is provided on the input shaft. The brake includes layered friction elements. The transmission transmits power from the input shaft to the output shaft. The transaxle casing includes a housing defining both a brake chamber and a transmission chamber. The brake chamber incorporates the brake. The transmission chamber incorporates the transmission. The spacing system is configured so as to provide the transaxle casing with a partition wall between the brake chamber and the transmission chamber, so as to hold a bearing in the partition wall to journal the input shaft, and so as to provide a spacer for the layered friction elements of the brake, the spacer defining a space in the axial direction of the input shaft in correspondence to a thickness of the layered friction elements in the axial direction of the input shaft.

2 Claims, 12 Drawing Sheets

TRANSAXLE

CROSS-REFERENCE TO RELATED APPLICATIONS

The present application claims priority to Japanese Patent Application No. 2014-122903, filed on Jun. 13, 2014.

BACKGROUND OF THE INVENTION

Field of the Invention

The present invention relates to a transaxle provided with a brake having layered friction elements.

Related Art

As disclosed by JP 2000-289588 A, there is a well-known conventional vehicle, such as an all-terrain vehicle (ATV), equipped with a transaxle. This transaxle includes a transaxle casing that incorporates a mechanical transmission including a reduction gear train and a differential gear unit. The transaxle casing is externally provided with a brake, so that it is unnecessary to additionally have a space, a supporting member, a casing, and a drive train for arranging the brake outside of the transaxle casing. The brake of the transaxle is a wet frictional brake in which layered frictional elements, such as frictional discs or steel plates, are adapted to be pressed against one another to brake a shaft in the transaxle casing. In the transaxle casing, a chamber incorporating the brake is formed separately from a chamber incorporating the mechanical transmission.

To change the capacity of the brake, it is conceivable to change the radius, material or number of layered frictional elements. To achieve such a change of layered frictional elements in radius, material or number, the transaxle casing has to be exchanged for another transaxle casing having a chamber suitable to the changed radius, material or number of layered frictional elements, thereby hindering standardization of the transaxle casing and the like, and thereby increasing the cost for inventory control of component parts, especially, different transaxle casings.

SUMMARY OF THE INVENTION

An object of the invention is to provide a transaxle including a transaxle casing incorporating a brake having layered friction elements, configured so as to enable standardization of the transaxle casing while the layered friction elements of the brake can have their thickness adjusted.

To achieve the object, a transaxle comprises an input shaft, a brake, an output shaft, a mechanical transmission, a transaxle casing, and a spacing system. The brake is provided on the input shaft. The brake includes layered friction elements. The transmission transmits power from the input shaft to the output shaft. The transaxle casing includes a housing defining both a brake chamber and a transmission chamber. The brake chamber incorporates the brake. The transmission chamber incorporates the transmission. The spacing system is configured such that the transaxle casing is provided with a partition wall between the brake chamber and the transmission chamber, so as to hold a bearing in the partition wall to journal the input shaft, and so as to provide a spacer for the layered friction elements of the brake, the spacer defining a space in the axial direction of the input shaft corresponding to a thickness of the layered friction elements in the axial direction of the input shaft.

Therefore, due to the spacer of the spacing system, the transaxle can properly hold the brake as well as the bearing, while the brake can have the thickness of its layered friction elements adjusted.

Preferably, the housing is formed with the partition wall having an inner peripheral portion defining a hole through which the input shaft is passed between the brake chamber and the transmission chamber, so that the inner peripheral portion of the partition wall holds the bearing disposed in the hole. The spacing system includes a member serving as the spacer. The member is separated from the housing, and is disposed in the brake chamber between the partition wall and the layered friction elements.

Therefore, the spacer for defining the space from the brake is provided separately from the housing. To define any one of different spaces for adjusting the capacity of the brake, an optimal spacer can be selected among different spacers having different thicknesses defining respective spaces in comparison with the case where a housing should be exchanged for another housing. The individual spacers can be made simply at low cost, thereby reducing cost for manufacturing the transaxles.

Further preferably, the spacing system includes a bearing holder separated from the transaxle casing. The bearing holder includes a cylindrical portion that holds the bearing. The bearing holder includes a spacer portion disposed in the brake chamber so as to serve as the spacer.

Therefore, the bearing holder serves as a common member configured to hold the bearing for journaling the input shaft and to serve as a spacer for the brake, thereby reducing the number of component parts for holding the bearing and for providing a spacer for the brake, promoting standardization of the component parts, and reducing costs for manufacturing and storing the component parts.

These and other objects, features and advantages of the invention will appear more fully from the following detailed description of the invention with reference to the attached drawings.

DETAILED DESCRIPTION OF THE INVENTION

Figure 1:
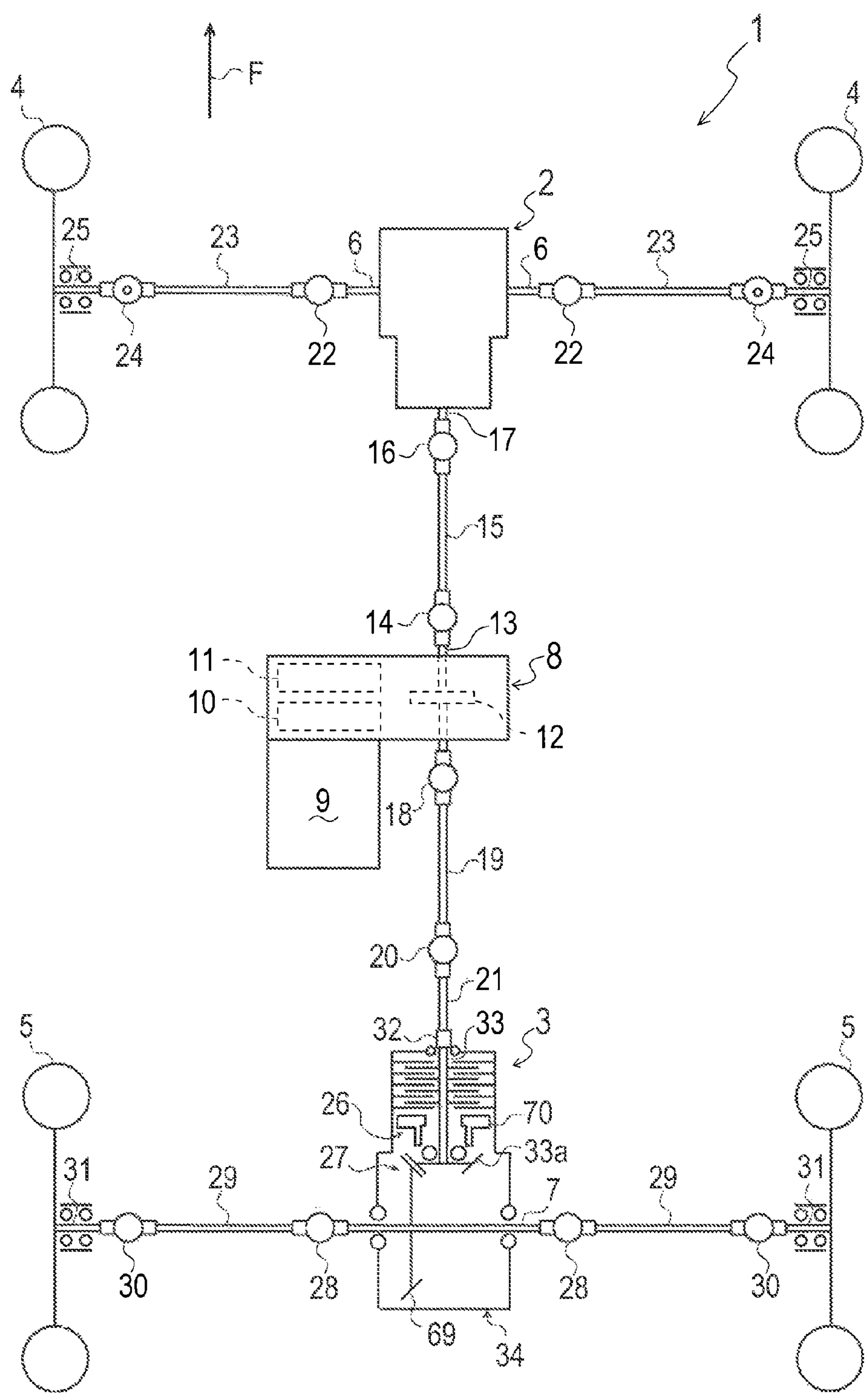
FIG. 1 is a schematic plan view of an entire vehicle equipped with a transaxle.

Hereinafter, descriptions of embodiments of the invention will be given on an assumption that a vehicle 1, e.g., ATV, faces forward in a direction designated by an arrow F as shown in FIG. 1. In this regard, words “longitudinal” and “longitudinally” will be referred to on the assumption that they mean the fore-and-aft direction of vehicle 1, and words “lateral” and “laterally” will be referred to on the assumption that they mean the right-and-left direction of vehicle 1.

Referring to FIG. 1, entire vehicle 1 will be described. Vehicle 1 is equipped with a front transaxle 2 carrying an output shaft (or right and left output shafts) 6 extended laterally, and drivingly and steerably connected at right and left distal ends thereof to respective axles 25 of right and left front wheels 4 via respective universal joints 22, propeller shafts 23, and steerably pivotal joints 24. Vehicle 1 is also equipped with a rear transaxle 3 carrying an output shaft 7 extended laterally, and drivingly connected at right and left distal ends thereof to respective axles 31 of right and left rear wheels 5 via respective constant velocity universal joints 28, propeller shafts 29, and universal joints 30.

Vehicle 1 is equipped with a transmission casing 8 and an engine 9 between front and rear transaxles 2 and 3. Transmission casing 8 carries a power distribution output shaft 13 extended longitudinally, and fixedly provided thereon with an output gear 12. A variable speed transmission 10 and a reverser mechanism 11 are disposed in transmission casing 8 so as to transmit power from engine 9 to power distribution output shaft 13 via output gear 12. Front transaxle 2 carries an input shaft 17 extended longitudinally, and a front end portion of power distribution output shaft 13 projects forward from transmission casing 8 so as to be drivingly connected to a rear end of input shaft 17 via a universal joint 14, a propeller shaft 15, and a universal joint 16. Rear transaxle 3 carries an input shaft 33 extended longitudinally, and a rear end portion of power distribution output shaft 13 projects rearward from transmission casing 8 so as to be drivingly connected to a front end of input shaft 33 via a universal joint 20, a propeller shaft 21, and a coupling sleeve 32.

In this way, the rotary power of power distribution output shaft 13 driven by engine 9 via variable speed transmission 10 and reverser mechanism 11 is distributed between front transaxle 2 and rear transaxle 3 so as to drive right and left front wheels 4 and right and left rear wheels 5.

Rear transaxle 3 will be described with reference to FIGS. 1 to 7 and 9. As shown in FIG. 1 to 4, a main housing 134, a front cover 37, and a side cover 38 are joined together so as to constitute a transaxle casing 34 of rear transaxle 3. Main housing 134 is formed at a front portion thereof with a brake housing 35 for incorporating a later-discussed brake 26, and is formed at a rear portion thereof with a gear housing 36 serving as a transmission housing for incorporating a later-discussed gear transmission 27 serving as a mechanical transmission 27.

Brake housing 35 has a front end opening 39, which is covered with front cover 37 fastened to brake housing 35 by bolts 41. Brake housing 35 and front cover 37 defines a brake chamber 43 for incorporating brake 26. On the other hand, gear housing 36 has a right or left end opening 40 (in this embodiment, a left end opening 40, corresponding to a later-discussed bevel gear 69 disposed leftward in gear housing 36), which is covered with side cover 38 fastened to gear housing 36 by bolts 42. Gear housing 36 and side cover 38 defines a gear chamber 43 serving as a transmission chamber for incorporating gear transmission 27 serving as the mechanical transmission.

Referring to FIGS. 4 to 6 and 9, input shaft 33 is extended longitudinally in brake chamber 43. A rear end portion of coupling sleeve 32 is inserted rearward into a shaft hole **37*a* of front cover 37 through a fluid seal 49, and a front portion of input shaft 33 is spline-fitted forward into the rear end portion of coupling sleeve 32. Ring-shaped fluid seal 49 is disposed in a front portion of shaft hole 37*a*, is fitted at an outer peripheral surface thereof to an inner peripheral surface of front cover 37 defining shaft hole 37*a*, and is fitted at an inner peripheral surface thereof onto an outer peripheral surface of the rear end portion of coupling sleeve 32, thereby fluid-tightly keeping brake chamber 43 filled with fluid from leaking the fluid to the outside of transaxle casing 34, while allowing input shaft 33 to extend outside-and-inside of transaxle casing 34**.

A brake hub sleeve 52 is spline-fitted onto an outer peripheral surface of a longitudinally intermediate portion of input shaft 33 unrotatably relative to input shaft 33. Brake hub sleeve 52 is inserted at a front portion thereof forward into a rear portion of shaft hole **37*a*, and abuts at a front end surface thereof against a rear end surface of coupling sleeve 32. A ball bearing 45 is disposed in the rear portion of shaft hole 37*a* and is interposed between brake hub sleeve 52 and front cover 37. Ball bearing 45 may be eliminated only if brake hub sleeve 52 and input shaft 33 are surely journalled by front cover 37**.

A ball bearing 46 is fitted on an outer peripheral surface of input shaft 33, and is disposed to abut at a front end thereof against a rear end surface of brake hub sleeve 52. Main housing 134 is formed with a partition wall 55 between brake housing 35 and gear housing 36, such as to serve as a partition between brake chamber 43 and gear chamber 44. Partition wall 55 is bored through with a connection hole **55*a* that is open at a front end thereof to brake chamber 43 and at a rear end thereof to gear chamber 44. Input shaft 33 is passed through connection hole 55*a*, and ball bearing 46 and a later-discussed cylindrical portion 70*b* of a later-discussed bearing holder 70 holding ball bearing 46 are disposed in connection hole 55*a* so that input shaft 33 is journalled by bearing holder 70 fitted to partition wall 55 of main housing 134 between brake housing 35 and gear housing 36 via ball bearing 46**.

Figure 3:
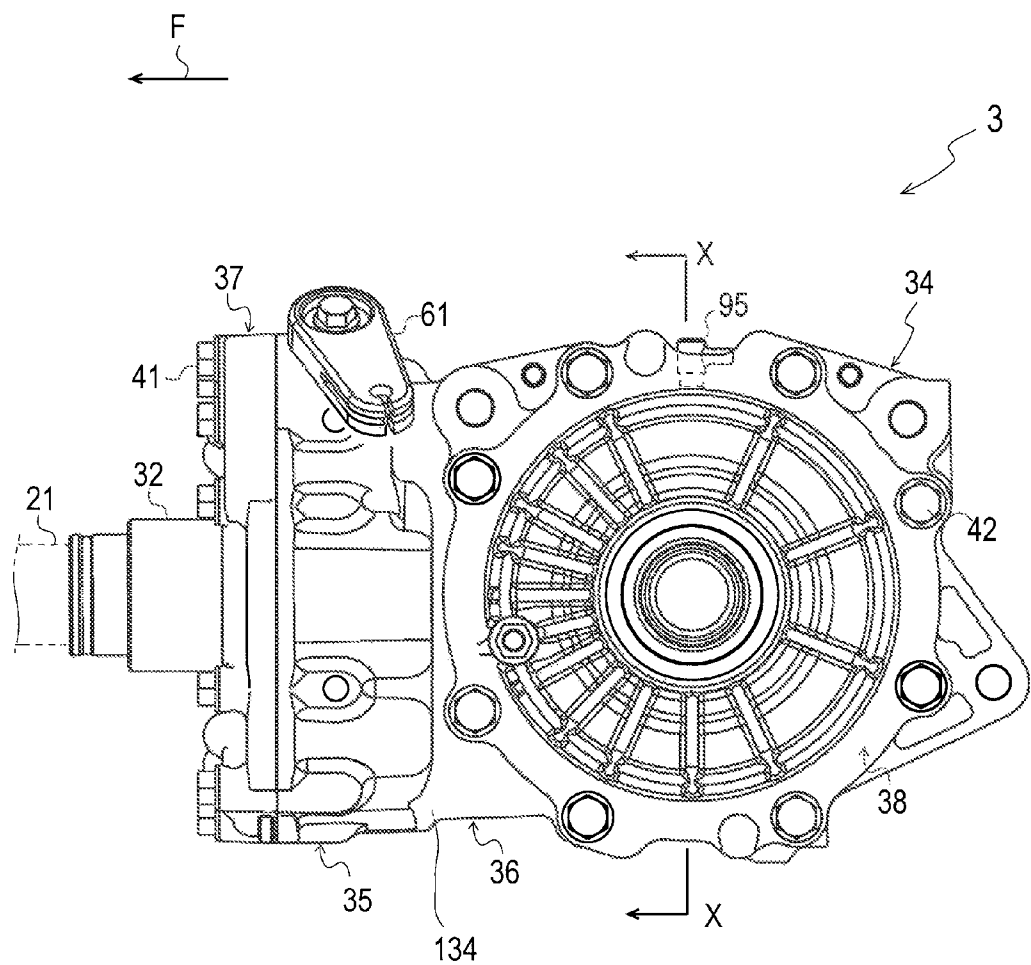
FIG. 3 is a side view of the transaxle.
Figure 4:
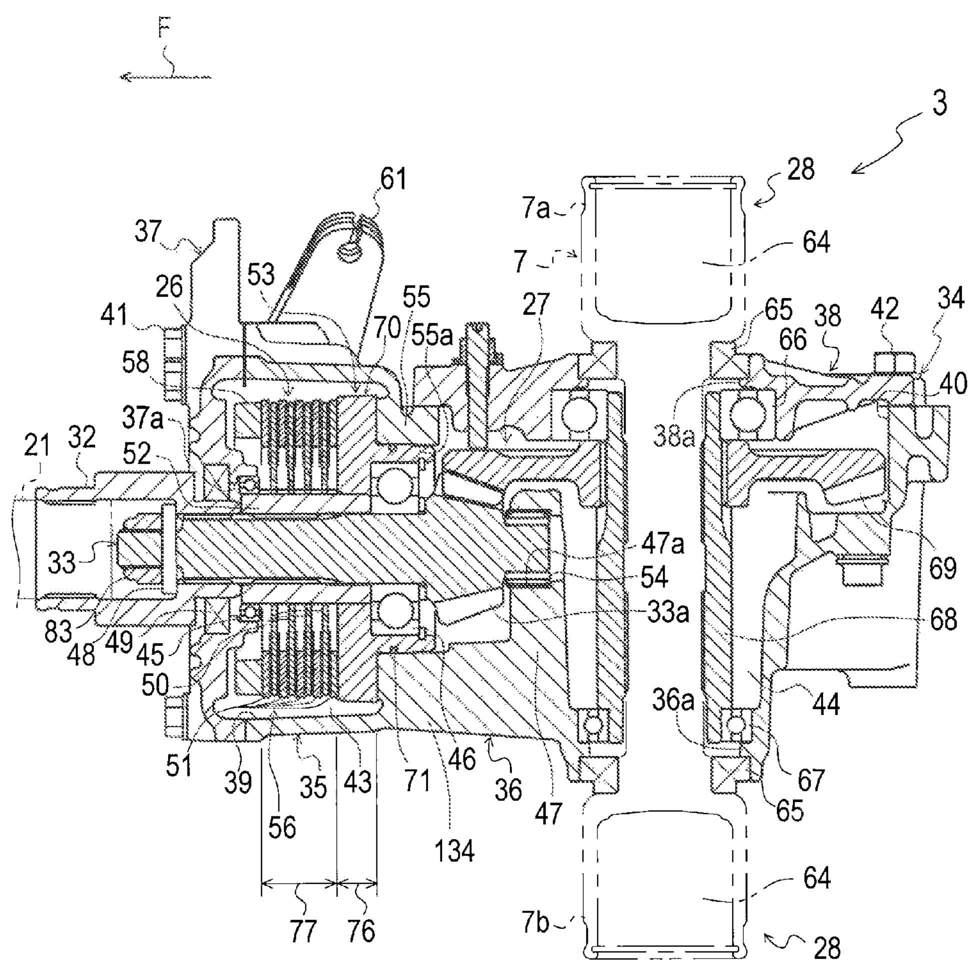
FIG. 4 is a sectional bottom view of the transaxle.

Referring to FIGS. 3 and 4, brake 26 including layered friction elements 56 is configured in brake chamber 43. Layered friction elements 56 consist of friction discs 50 and steel discs 51 alternately layered in the axial direction of input shaft 33. As shown in FIG. 4, ring-shaped friction discs 50 are spline-fitted at inner peripheral edges thereof to brake hub sleeve 52 longitudinally slidably along brake hub sleeve 52 and unrotatably relative to brake hub sleeve 52. Ring-shaped steel discs 51 are engaged at outer peripheral edges thereof to an inner peripheral surface portion of brake housing 35 defining brake chamber 43 unrotatably relative to brake housing 35 of transaxle casing 34, although only FIG. 1 schematically illustrates brake 26 appearing to have steel discs 51 engaged to brake housing 35 at the front portion of transaxle casing 34 of rear transaxle 3.

Figure 5:
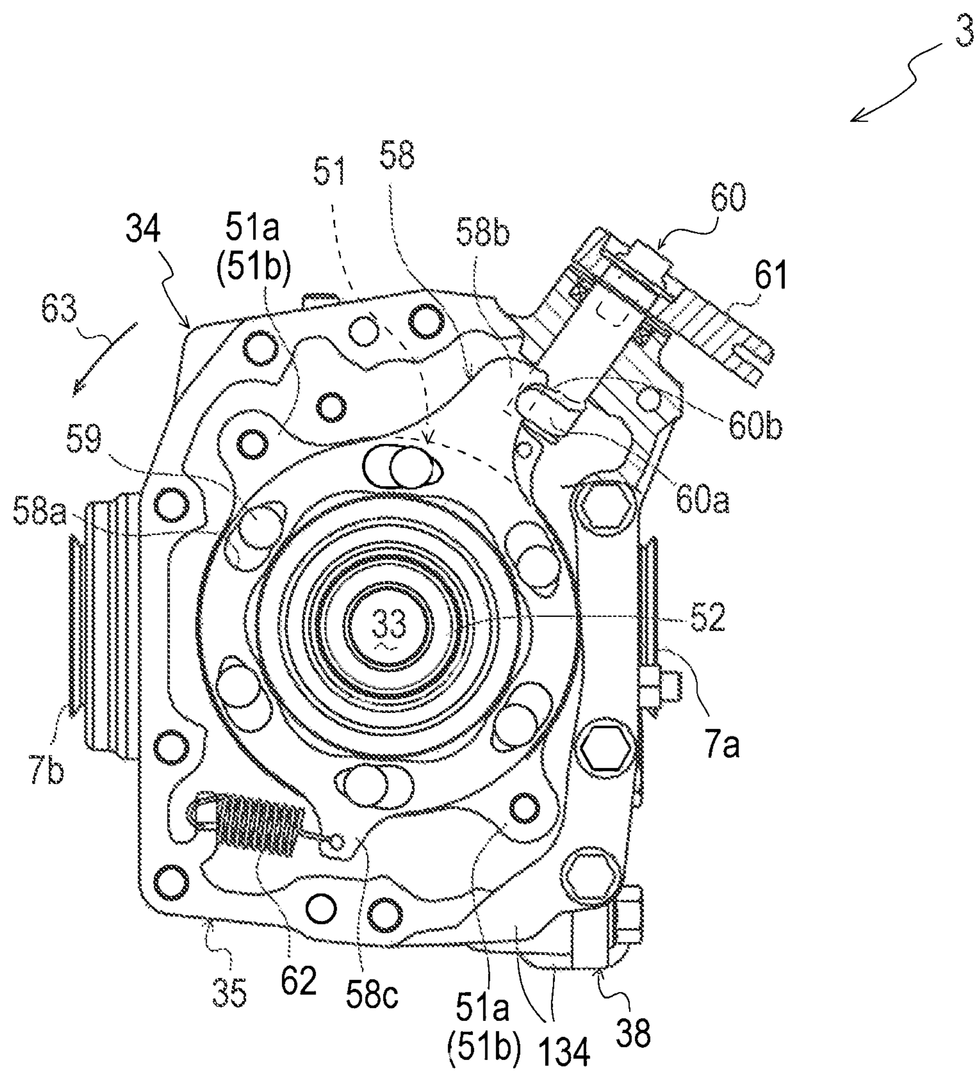
FIG. 5 is a front view partly in section of the transaxle from which a front cover has been removed.
Figure 9:
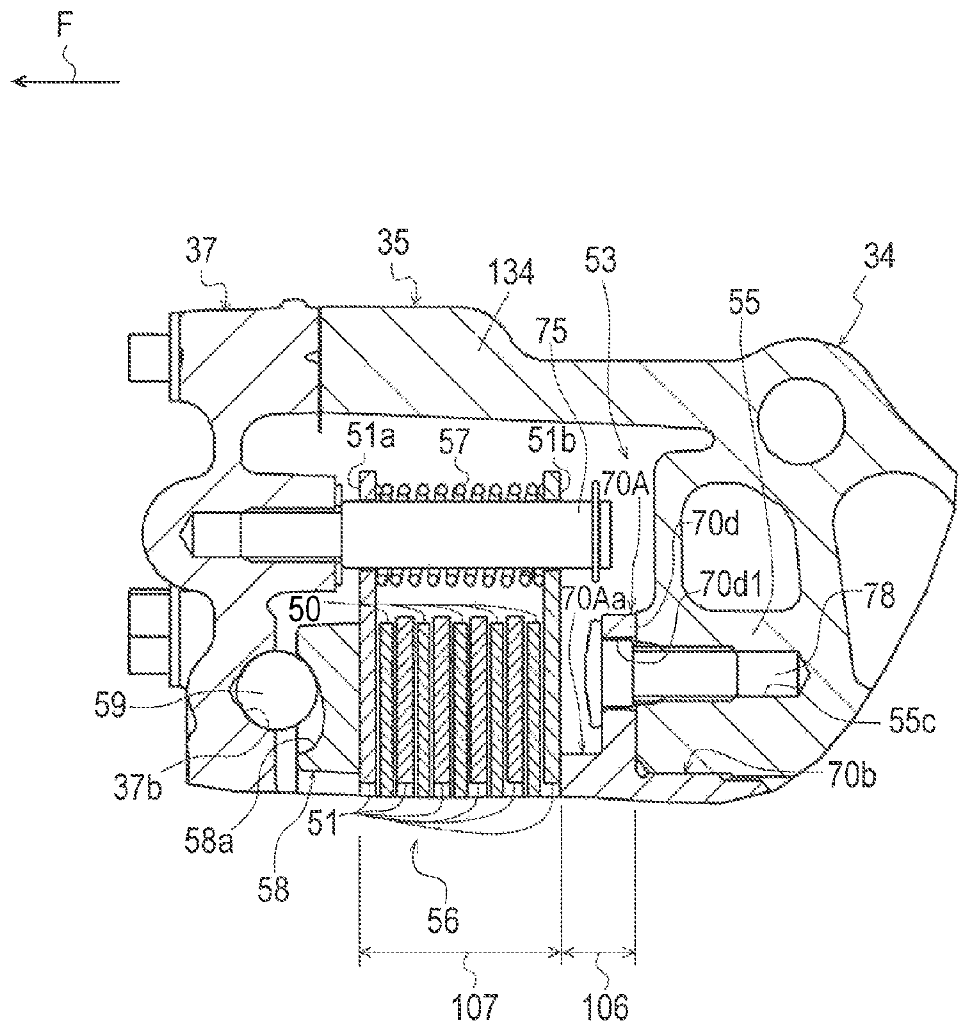
FIG. 9 is a sectional side view of an upper portion of the spacing system corresponding to a brake having increased layered friction elements.

Referring to FIGS. 5 and 9, foremost and rearmost steel discs 51 are formed with respective stays **51*a* and 51*b* projecting radially centrifugally. Slide guide pins 75 are extended longitudinally, i.e., parallel to input shaft 33, and are axially slidably passed through respective stays 51*a* of foremost steel disc 51 and respective stays 51*b* of rearmost steel disc 51. A front end portion of each slide guide pin 75 projecting forward from stay 51*a* of foremost steel disc 51 is inserted and fixed in front cover 37. A flange 75*a* is fixed on a rear portion of each slide guide pin 75 projecting rearward from stay 51*b* of rearmost steel disc 51 so as to prevent rearmost steel disc 51 from sliding further rearward. Springs 57 are wound around respective slide guide pins 75 between stays 51*a* and 51*b* so as to bias foremost and rearmost steel discs 51 away from each other, thereby keeping alternately layered friction discs 50 and steel discs 51** separate from one another.

Referring to FIGS. 4 to 6 and 9, a pressure plate 58 is disposed around a central rear portion of front cover 37 having shaft hole 37*a*, and contacts foremost steel disc 51 at a rear end surface thereof. Pressure plate 58 is longitudinally slidable in the axial direction of input shaft 33, and is rotatable relative to transaxle casing 34, i.e., steel discs 51. Pressure plate 58 is formed with recesses 58*a* opened at a front end surface of pressure plate 58. Each recess 58*a* is extended in the peripheral direction of pressure plate 58 with respect to input shaft 33, and recesses 58*a* are aligned in this peripheral direction. In the peripheral direction of pressure plate 58, one end portion of each recess 58*a* has a rearward depth and a width in the radial direction of pressure plate 58, which are larger than those of the other end portion of each recess 58*a*.

On the other hand, front cover 37 is formed with semi-spherical recesses 37*b* opened at a rear end surface of front cover 37. Cam balls 59 are fitted at front halves thereof into respective recesses 37*b* and are fitted at rear portions thereof into respective recesses 58*a*. Therefore, by rotating pressure plate 58 relative to front cover 37, i.e., transaxle casing 34, the depth of the rear portions of cam balls 59 in respective recesses 58*a* of pressure plate 58 is changed so that pressure plate 58 also moves in the axial direction of input shaft 33. Referring to FIG. 5, as pressure plate 58 rotates in a direction designated by an arrow 63, the depth of cam balls 59 in recesses 58*a* becomes shallower so that pressure plate 58 moves rearward in the direction to press layered discs 50 and 51 against one another, thereby activating brake 26 to brake input shaft 33.

Figure 6:
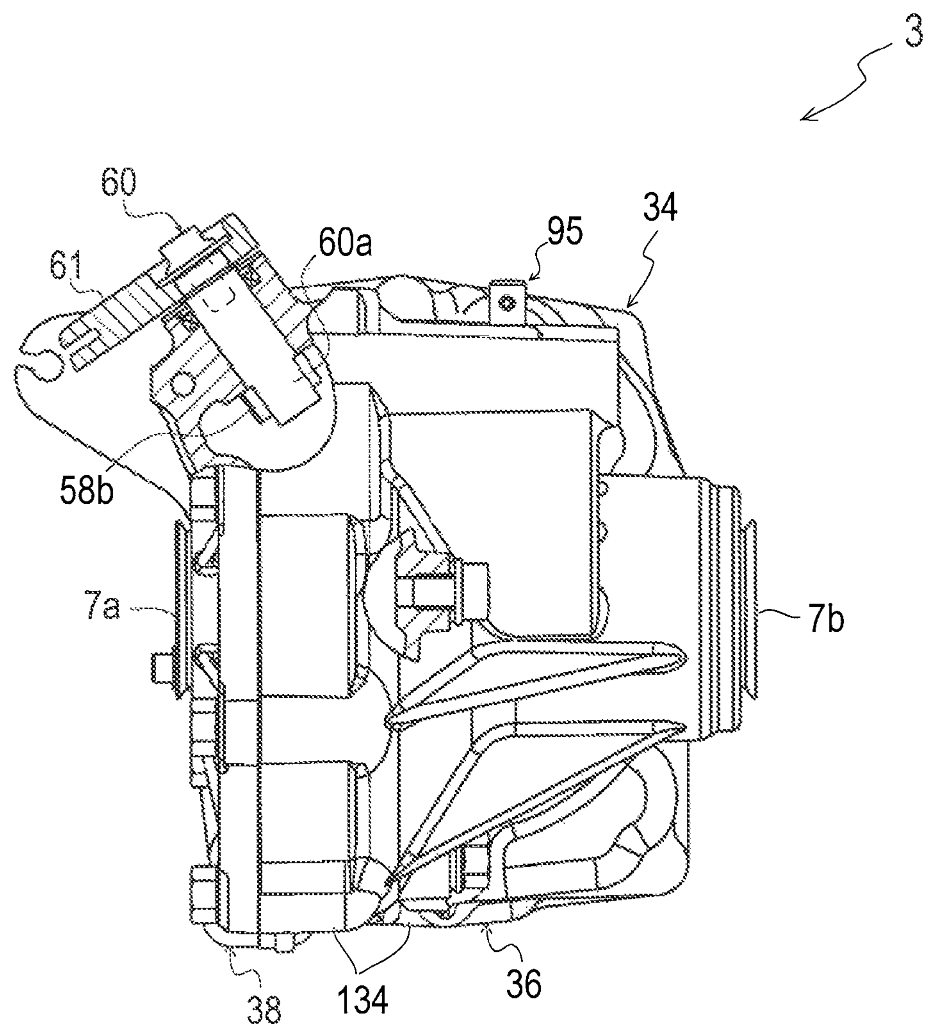
FIG. 6 is a rear view partly in section of the transaxle.

Referring to FIGS. 5 and 6, pressure plate 58 is formed with first and second arms 58*b* and 58*c* extended radially centrifugally and opposite each other with respect to input shaft 33. A brake operation shaft 60 is pivotally supported by a left upper portion of brake housing 35. Brake operation shaft 60 is extended leftwardly and upwardly slantwise in the radial direction of input shaft 33, so that a phantom axial line of brake operation shaft 60 extended rightwardly downward therefrom intersects the longitudinal axis of input shaft 33. In brake chamber 43, a lower portion of brake operation shaft 60 is formed with a hook 60*a* extended forward therefrom so as to have a hook groove between hook 60*a* and the lower portion of brake operation shaft 60. First arm 58*b* is inserted into the hook groove and abuts at a right edge thereof against hook 60*a*.

An upper portion of brake operation shaft 60 projects outward from brake housing 35, i.e., transaxle casing 34, so as to be fixedly provided thereon with a basal end portion of a brake operation arm 61. Brake operation arm 61 is operatively connected at an utmost end portion thereof to a brake-operating manipulator (not shown), e.g., a brake pedal, via a link, e.g., a wire (not shown). In brake chamber 43, a spring 62 is interposed between second arm 58*c* of pressure plate 58 and brake housing 35. On the assumption that a brake pedal serves as the brake-operating manipulator, spring 62 biases pressure plate 58 to an unbraking position defined by the brake pedal when undepressed. In other words, un the brake pedal is depressed, spring 62 holds pressure plate 58 at the unbraking position where the depth of can balls 59 in recesses 58*a* is maximized so that pressure plate 58 is kept at the foremost limit position of its axial slidable range, thereby keeping discs 50 and 51 of layered friction elements 56 separate from one another, whereby brake 26 is not activated to brake input shaft 33.

As the brake pedal is depressed, the link is moved to rotate brake operation shaft 60 so that hook 60*a* rotates to push first arm 58*b* of pressure plate 58 so as to rotate pressure plate 58 in the direction designated by arrow 63, whereby pressure plate 58 moves rearward to reduce the depth of earn balls 59 in recesses 58*a* so as to press discs 50 and 51 of layered friction elements 56 against one another. Therefore, brake 26 is activated to brake input shaft 33.

Figure 7:
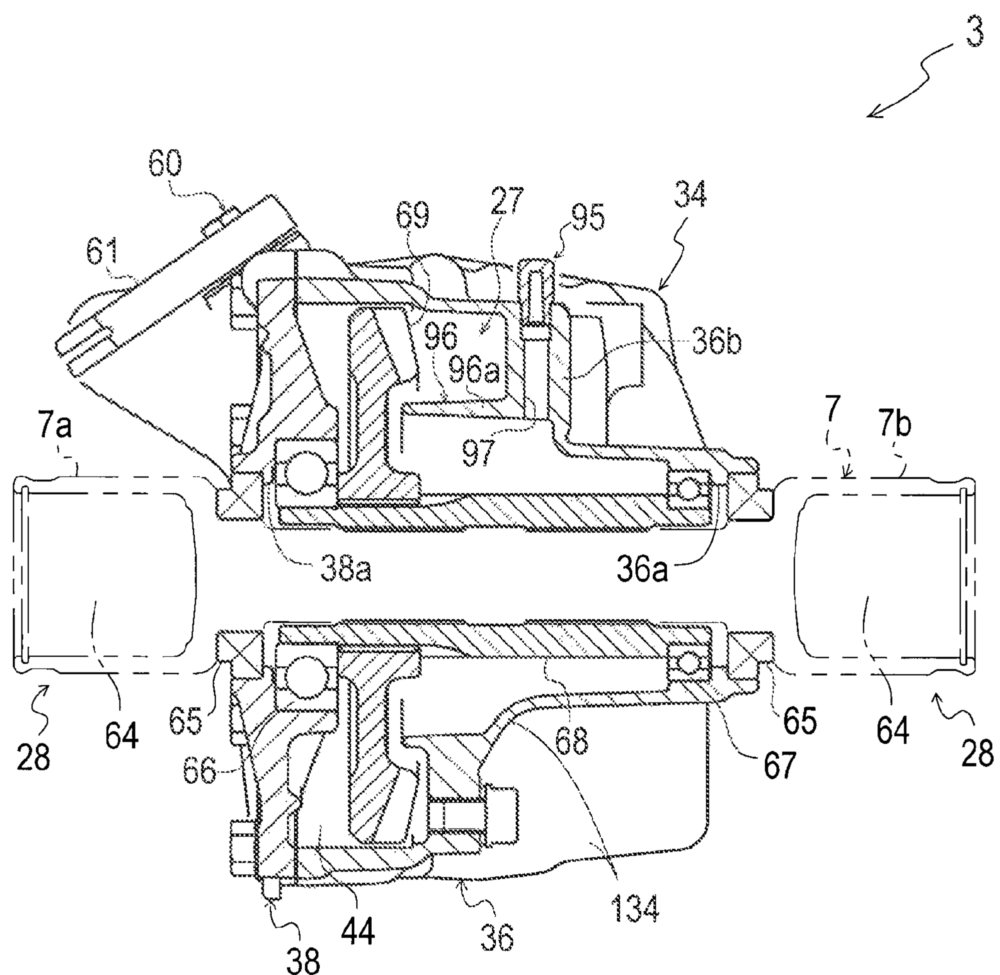
FIG. 7 is a cross sectional view of the transaxle taken along X-X line of FIG. 3.

Referring to FIGS. 1, 4 and 7, output shaft 7 is extended laterally in gear chamber 44. Right and left end portions of output shaft 7 project rightward and leftward from right and left ends of transaxle casing 34 and are formed as housing-shaped joints 7*a* having respective recesses 64 open at distal ends thereof. Joints on the proximal ends of respective propeller shafts 29 are fitted into recesses 64 of right and left housing-shaped joints 7*a*, so that housing-shaped joints 7*a* and the joints in recesses 64 constitute constant velocity universal joints 28 between output shaft 7 and right and left propeller shafts 29 drivingly connected to right and left rear wheels 5.

A right end portion of gear housing 36 serves as the right end portion of transaxle casing 34 from which the right end portion of output shaft 7 serving as right housing-shaped joints 7*a* projects rightwardly outward. A shaft hole 36*a* is formed through the right end portion of gear housing 36 so as to allow a right portion of output shaft 7 to extend therethrough. A ring-shaped fluid seal 65 is disposed in a right portion of shaft hole 36*a*, is fitted at an outer peripheral surface thereof to an inner peripheral surface of the right end portion of gear housing 36 defining shaft hole 36*a*, and is fitted at an inner peripheral surface thereof onto an outer peripheral surface of the right portion of output shaft 7 in shaft hole 36*a*.

On the other hand, side cover 38 serves as the left end portion of transaxle casing 34 from which the left end portion of output shaft 7 serving as left housing-shaped joints 7*a* projects leftwardly outward. A shaft hole 38*a* is formed through side cover 38 so as to allow a left portion of output shaft 7 to extend therethrough. Another ring-shaped fluid seal 65 is disposed in a left portion of shaft hole 38*a*, is fitted at an outer peripheral surface thereof to an inner peripheral surface of side cover 38 defining shaft hole 38*a*, and is fitted at an inner peripheral surface thereof onto an outer peripheral surface of the left portion of output shaft 7 in shaft hole 38*a*. Therefore, right and left fluid seals 65 fluid-tightly keep gear chamber 44 filled with fluid from leaking the fluid to the outside of transaxle casing 34, while allowing output shaft 7 from the inside of transaxle casing 34 to the right and left outsides of transaxle casing 34.

In gear chamber 44, a spline sleeve 68 is spline-fitted onto an outer peripheral surface of output shaft 7. A ball bearing 66 is disposed in a right portion of shaft hole 38*a*, and is fitted on an outer peripheral surface of a left end portion of spline sleeve 68, so that the left end portion of spline sleeve 68 is journalled by side cover 38 via ball bearing 66. A ball bearing 67 is disposed in a left portion of shaft hole 36*a*, and is fitted on an outer peripheral surface of a right end portion of spline sleeve 68, so that the right end portion of spline sleeve 68 is journalled by gear housing 36 via ball bearing 67.

A gear transmission 27 serving as the mechanical transmission for transmitting power from input shaft 33 to output shaft 7 is configured in gear chamber 44. In this regard, gear housing 36 of main housing 134 is formed with a bearing wall 47 extended laterally (in this embodiment, leftward) in gear chamber 44. A needle bearing 54 is fitted in a shaft hole 47*a* formed through bearing wall 47, and a rear end portion of input shaft 33 is inserted into needle bearing 54 so as to be journalled by bearing wall 47 via needle bearing 54. A bevel pinion 33*a* is formed on a rear portion of input shaft 33 between ball bearing 46 and shaft hole 47*a*.

Bevel gear 69 that is diametrically larger than bevel pinion 33*a* is disposed leftward in gear chamber 44 close to side cover 38, and is spline-fitted on an outer peripheral surface of spline sleeve 68 unrotatably relative to spline sleeve 68 and output shaft 7. Bevel gear 69 meshes at a front portion thereof with a left portion of bevel pinion 33*a*. Therefore, bevel pinion 33*a* and bevel gear 69 constitute a reduction gear train serving as gear transmission 27.

Gear transmission 27 including bevel pinion 33*a* and bevel gear 69 should be considered as typical one of mechanical transmissions that may be incorporated in the transmission chamber referred to as gear chamber 44 in this embodiment. For example, a friction disk type transmission may serve as another mechanical transmission incorporated in the transmission chamber provided in rear transaxle 3.

Figure 2:
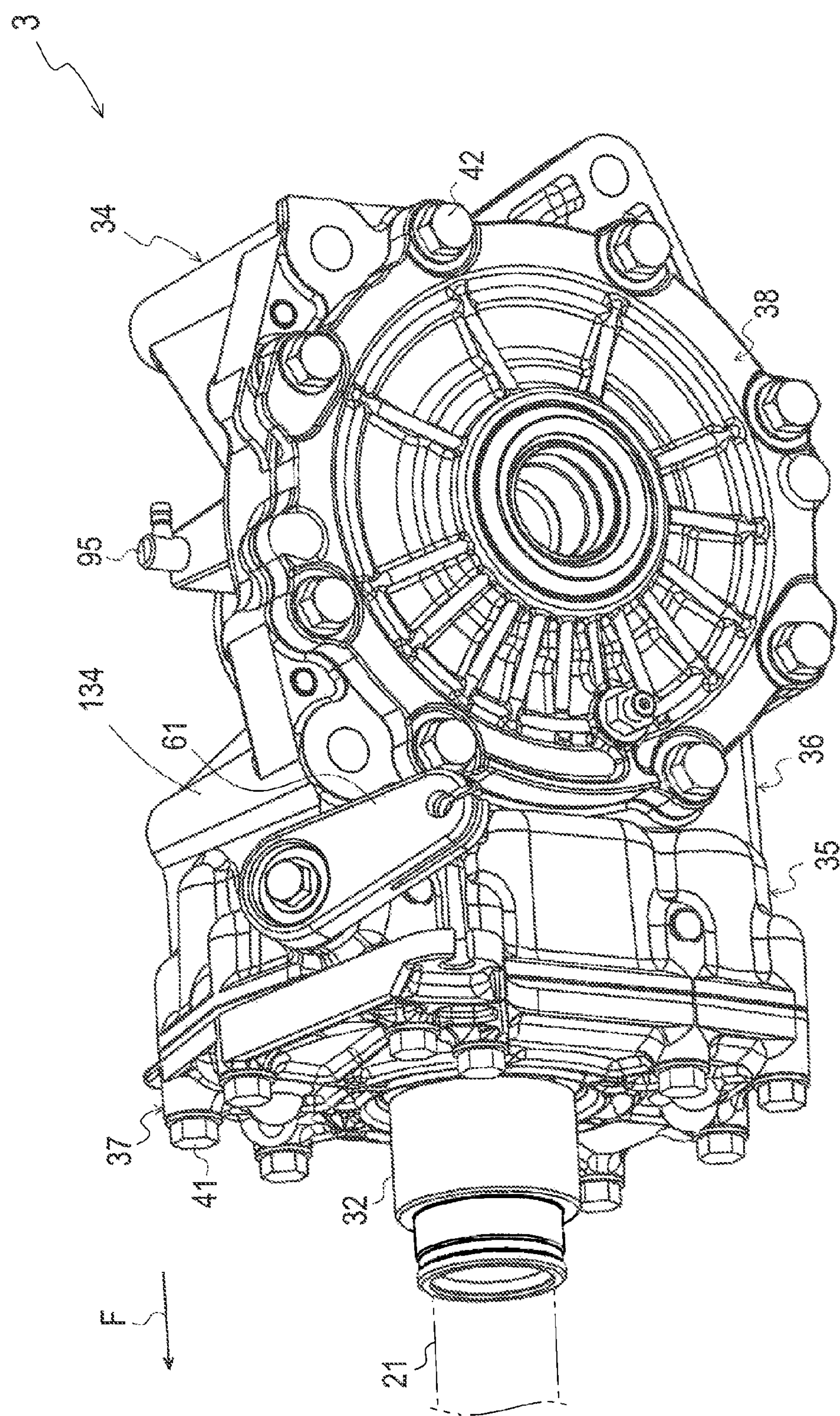
FIG. 2 is a perspective view of the transaxle.

Referring to FIGS. 2, 3 and 7, a breather 95 is provided on an upper portion of gear housing 36 so as to prevent a pressure of the fluid in gear chamber 44 from increasing to cause the fluid to leak out from transaxle casing 34. In this regard, gear housing 36 is formed with a vertical wall 36*b*, which defines a laterally intermediate portion of gear chamber 44. Vertical wall 36*b* is defined as a right end wall of an upper portion of the left portion of gear chamber 44 accommodating bevel gear 69. A portion of gear chamber 44 below vertical wall 36*b* is expanded rightward and leftward from vertical wall 36*b* so as to accommodate output shaft 7 and spline sleeve 68. In this regard, a right lower cylindrical portion of gear housing 36 defining a right lower portion of gear chamber 44 is extended rightward from a bottom portion of vertical wall 36*b* so as to have shaft hole 36*a* at the right end portion thereof, and gear housing 36 is formed with a cylindrical rib 96 that is extended leftward from the bottom portion of vertical wall 36*b* so as to have a left end thereof close to a right end surface of bevel gear 69.

A vertical vent hole 97 is formed through vertical wall 36*b*. Breather 95 is fitted into a top portion of vent hole 97. A bottom end of vent hole 97 is open at an inner peripheral surface of an upper portion 96*a* of rib 96. Bevel gear 69 having the great diameter, when it rotates, has a great peripheral speed so as to greatly agitate the fluid in the left portion of gear chamber 44 therearound, thereby splashing vertical wall 36*b* with fluid from the peripheral edge of rotating bevel gear 69. However, vent hole 97 formed in vertical wall 36*b* is protected by a left end surface of vertical wall 36*b* facing the left portion of gear chamber 44 from subjecting to the fluid splashed by bevel gear 69. Further, the bottom end of vent hole 97 faces therebelow the laterally intermediate portion of gear chamber 44 accommodating the laterally intermediate portion of spline sleeve 68 on output shaft 7 rightward from bevel gear 69. When input shaft 33 rotates, the laterally intermediate portion of spline sleeve 68 having a small diameter rotates at a small peripheral speed so as not to wrongly agitate the fluid in gear chamber 44 therearound below the bottom end of vent hole 97. Further, rib 96 extended to approach bevel gear 69 and to surround the laterally intermediate portion of spline sleeve 68 prevents the fluid agitated by bevel gear 69 from being introduced into the fluid in the portion of gear chamber 44 below vertical wall 36*b* around the laterally intermediate portion of spline sleeve 68. Therefore, the fluid in gear chamber 44 is prevented from flushing upward into vent hole 97 and leaking out through breather 95 fitted in the top portion of vent hole 97.

Figure 8:
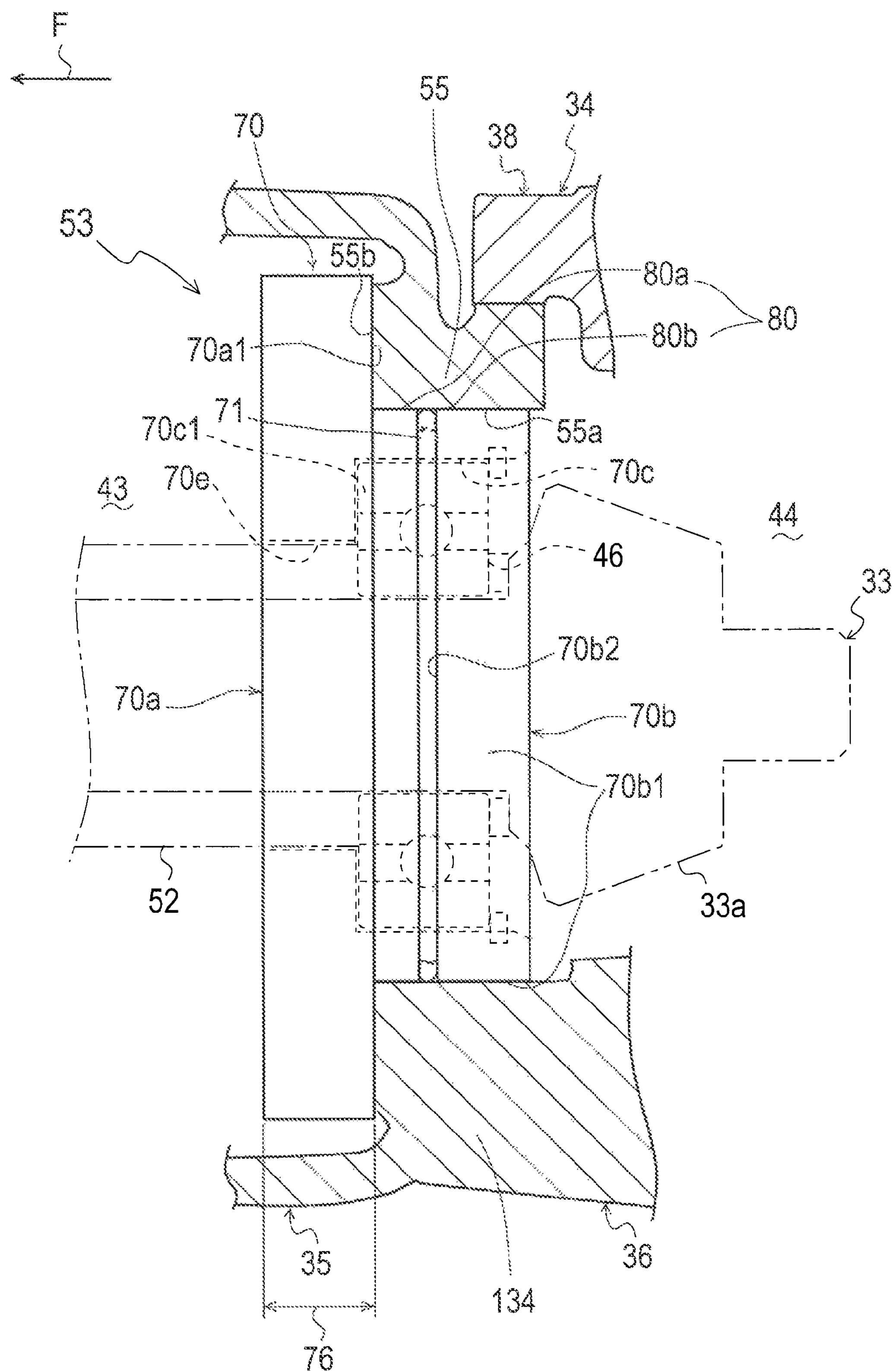
FIG. 8 is a sectional bottom view of a spacing system.

Referring to FIGS. 4, 8 and 9, a spacing system 53 for holding ball bearing 46 and for adjusting an axial thickness of layered friction elements 56 will be described. Bearing holder 70 holding ball bearing 46 constitutes spacing system 53. In this regard, bearing holder 70 is a member separated from all divisional members of transaxle casing 34, i.e., main housing 134, front cover 37 and side cover 38. Bearing holder 70 is a cylindrical member having an axis coinciding to the longitudinal axis of input shaft 33. Referring to FIG. 8, bearing holder 70 is radially stepped in an outer peripheral region thereof so as to include a diametrically large front cylindrical portion 70*a*, a diametrically small rear cylindrical portion 70*b*, and a vertical step surface 70*a*1 extended between a rear end of front cylindrical portion 70*a* and a front end of rear cylindrical portion 70*b*. Bearing holder 70 is also radially stepped in an inner peripheral region thereof so as to define a diametrically small front axial hole 70*e*, a diametrically large rear axial hole 70*c*, and so as to include a vertical step surface 70*c*1 extended between a rear end of diametrically small front axial hole 70*e* and a front end of diametrically large rear axial hole 70*c*. In embodiments, spacing system 53 can include a spacer or a shim (or shims).

Input shaft 33 are passed though front and rear axial holes 70*e* and 70*c* of bearing holder 70 so as to be surrounded by bearing holder 70. Ball bearing 48 is disposed in rear axial hole 70*c* so that ball bearing 48 is fitted at an inner peripheral surface thereof to an outer peripheral surface of input shaft 33, is fitted at an outer peripheral surface thereof to an inner peripheral surface of bearing holder 70 defining rear axial hole 70*c*, and abuts at a front end thereof against vertical step surface 70*c*1 of hearing holder 70.

Diametrically small rear cylindrical portion 70*b* of bearing holder 70 is inserted rearward into connection hole 55*a* through partition wall 55 of main housing 134 so as to face at an outer peripheral surface 70*b*1 thereof to an inner peripheral surface of partition wall 55 defining connection hole 55*a*, so that ball bearing 48 fitted in rear axial hole 70*c* of bearing holder 70 and on input shaft 33 comes in connection hole 55*a*. In this state, actually, a gap 80 exists between outer peripheral surface 70*b*1 of rear cylindrical portion 70*b* of bearing holder 70 and the inner peripheral surface of partition wall 55 defining connection hole 55*a*, so that fluid may flow through gap 80 between brake chamber 43 and gear chamber 44. A free flow of fluid through gap 80 between brake chamber 43 and gear chamber 44 may have a problem in such a case where brake chamber 43 is filled with a fluid having a large friction coefficient appropriate to wet multi-friction disk brake 26 and gear chamber 44 is filled with another fluid having a small friction coefficient appropriate to gear transmission 27. Therefore, to prevent the different fluids in respective chambers 43 and 44 from being mixed with each other, an annular groove 70*b*2 is formed on outer peripheral surface 70*b*1 of rear cylindrical portion 70*b*, and an O-ring 71 is fitted at an inner peripheral edge thereof into annular groove 70*b*2, and is fitted at an outer peripheral edge thereof to the inner peripheral surface of partition wall 55 defining connection hole 55*a*, so as to divide gap 80 into a front gap 80*a* extended forward from O-ring 71 to brake chamber 43 and a rear gap 80*b* extended rearward from O-ring 71 to gear chamber 44. In this way, O-ring 71 fluid-tightly isolates front gap 80*a* and rear gap 80*b* from each other surely.

Partition wall 55 of main housing 134 has a vertical front end surface 55*b*. Vertical step surface 70*a*1 of bearing holder 70 at the rear end of front cylindrical portion 70*a* abuts against vertical front end surface 55*b* of partition wall 55 of main housing 134. Referring to FIG. 9, bearing holder 70 (in the embodiment shown in FIG. 9, designated by a reference numeral "70A" as discussed later) is formed with at least one bolt tab 70*d* having a bolt hole 70*d*1. Bolt tab 70*d* is extended radially centrifugally from an outer peripheral surface of front cylindrical portion 70*a* (in the embodiment shown in FIG. 9, designated by a reference numeral "70Aa" as discussed later). Bolt tab 70*d* has a vertical rear end surface continuing to vertical step surface 70*a*1, so that, when vertical step surface 70*a*1 abuts against vertical front end surface 55*b* of partition wall 55, the vertical rear end surface of bolt tab 70*d* also abuts against vertical front end surface 55*b*. A thickness of bolt tab 70*d* in the axial direction of bearing holder 70 and input shaft 33 is smaller than that of front cylindrical portion 70*a*, so that a space is ensured forward from bolt tab 70*d* along the outer peripheral surface of front cylindrical portion 70*a*. A bolt 78 is screwed rearward through bolt hole 70*d*1 into partition wall 55 of main housing 134 of transaxle casing 34 so as to fasten bearing holder 70 to partition wall 55. A head of bolt 78 is disposed in the space forward from bolt tab 70*d* along the outer peripheral surface of front cylindrical portion 70*a*. By loosening bolt 78, bearing holder 70 can easily be detached from transaxle casing 34, i.e., partition wall 55 of main housing 134.

Rearmost steel disc 51 abuts against a front end surface of front cylindrical portion 70*a* of bearing holder 70 as well as foremost steel disc 51 abuts against a rear end surface of pressure plate 58, so that layered friction elements 56 are sandwiched between the front end surface of front cylindrical portion 70*a* of bearing holder 70 and the rear end surface of pressure plate 58. Therefore, front cylindrical portion 70*a* of bearing holder 70 functions as a spacer between the rear end of layered friction elements 56 and the front end of partition wall 55 of main housing 134 of transaxle casing 34. Hereinafter, front cylindrical portion 70*a* is referred to as spacer portion 70*a*.

The number of discs 50 and 51 of layered friction elements 56 can be changed by adding or removing discs 50 and 51. In correspondence to the change in number of discs 50 and 51 of layered friction elements 56, bearing holder 70 is exchanged for another bearing holder 70 whose spacer portion 70*a* has a different axial thickness. For example, in the embodiment shown in FIG. 4, layered friction elements 56 consist of nine discs 50 and 51, i.e., four friction discs 50 and five steel discs 51, so as to have an axial thickness 77. Spacer portion 70*a* of bearing bolder 70 has an axial thickness 76 corresponding to axial thickness 77 of layered friction elements 56 consisting of nine discs 50 and 51. If the number of discs 50 and 51 of layered friction elements 56 is increased in order to increase a braking force of brake 26, the axial thickness of layered friction elements 56 becomes larger than axial thickness 77, and bearing holder 70 should be exchanged for another bearing holder 70 whose spacer portion 70*a* has an axial thickness that is smaller than axial thickness 76. For example, in the embodiment shown in FIG. 9, layered friction elements 56 consist of eleven discs 50 and 51, i.e., five friction discs 50 and six friction discs 51, so as to have an axial thickness 107 larger than axial thickness 77. In correspondence to layered friction elements 56 having axial thickness 107, an alternative bearing holder 70A whose spacer portion 70Aa has an axial thickness 106 that is smaller than axial thickness 76 replaces bearing holder 70.

In this way, referring to FIGS. 4, 8 and 9, spacing system 53 is configured so that hearing holder 70 for holding ball bearing 46 is formed integrally with spacer portion 70*a* that serves as a spacer for a gap between layered friction elements 56 and partition wall 55 of transaxle casing 34 defining a rear end of brake chamber 43. Therefore, by detaching bearing holder 70 (with input shaft 33) from transaxle casing 34, ball bearing 46 can easily be detached together with bearing holder 70 (and input shaft 33) from transaxle casing 34, thereby facilitating maintenance of ball bearing 46.

Also, spacing system 53 is configured so as to use one selected among bearing holders 70 (and 70A) whose spacer portions 70*a* (and 70Aa) have different axial thicknesses in correspondence to respective different axial thicknesses of layered friction elements 56. In other words, spacing system 53 provide a variable spacer corresponding to a variable axial thickness of layered friction elements 56 by preparing different bearing holders 70 (and 70A) whose spacer portions 70*a* (and 70Aa) have different axial thicknesses for transaxles including respective multi-disc brakes having different capacities.

Incidentally, the change of axial thickness of layered friction elements 56 does not always mean the change of capacity of brake 26, and the difference of axial thickness of layered friction elements 56 derives not only from the difference in number of discs 50 and 51 but also from the difference of thickness of each disc 50 or 51 or from another cause. However, the change in number of discs 50 and 51 by adding or removing discs 50 and 51 to change the axial thickness of layered friction elements 56 is one of the most economic manners for changing the capacity of brake 26, because it is advantageous to standardize friction discs 50 and steel discs 51 each of which has a standardized thickness. Therefore, spacing system 53 is also advantageous to promote the standardization of discs 50 and 51 of layered friction elements 56 as multi-disc brake 26.

Figure 10:
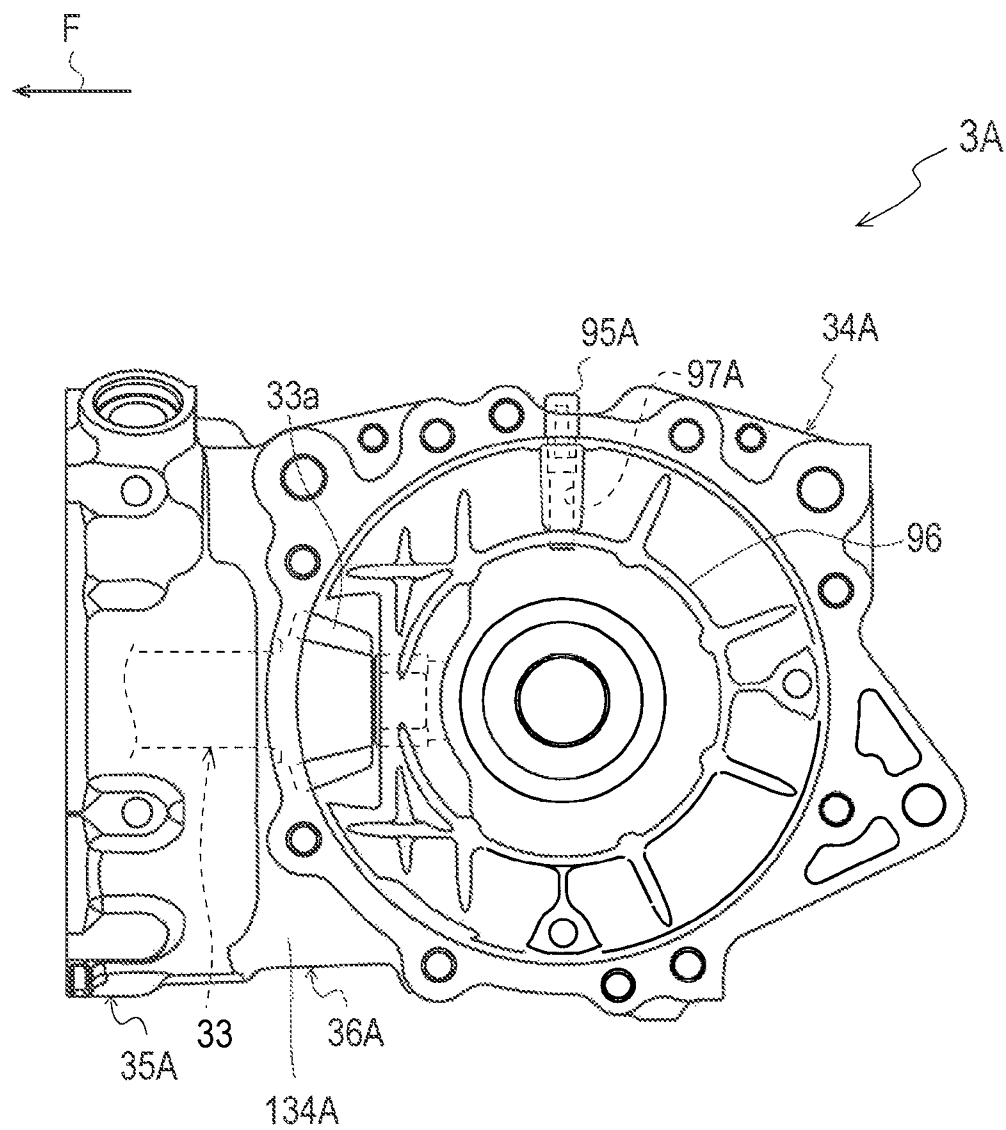
FIG. 10 is a side view of an alternative transaxle from which the front cover and a side cover have been removed.
Figure 11:
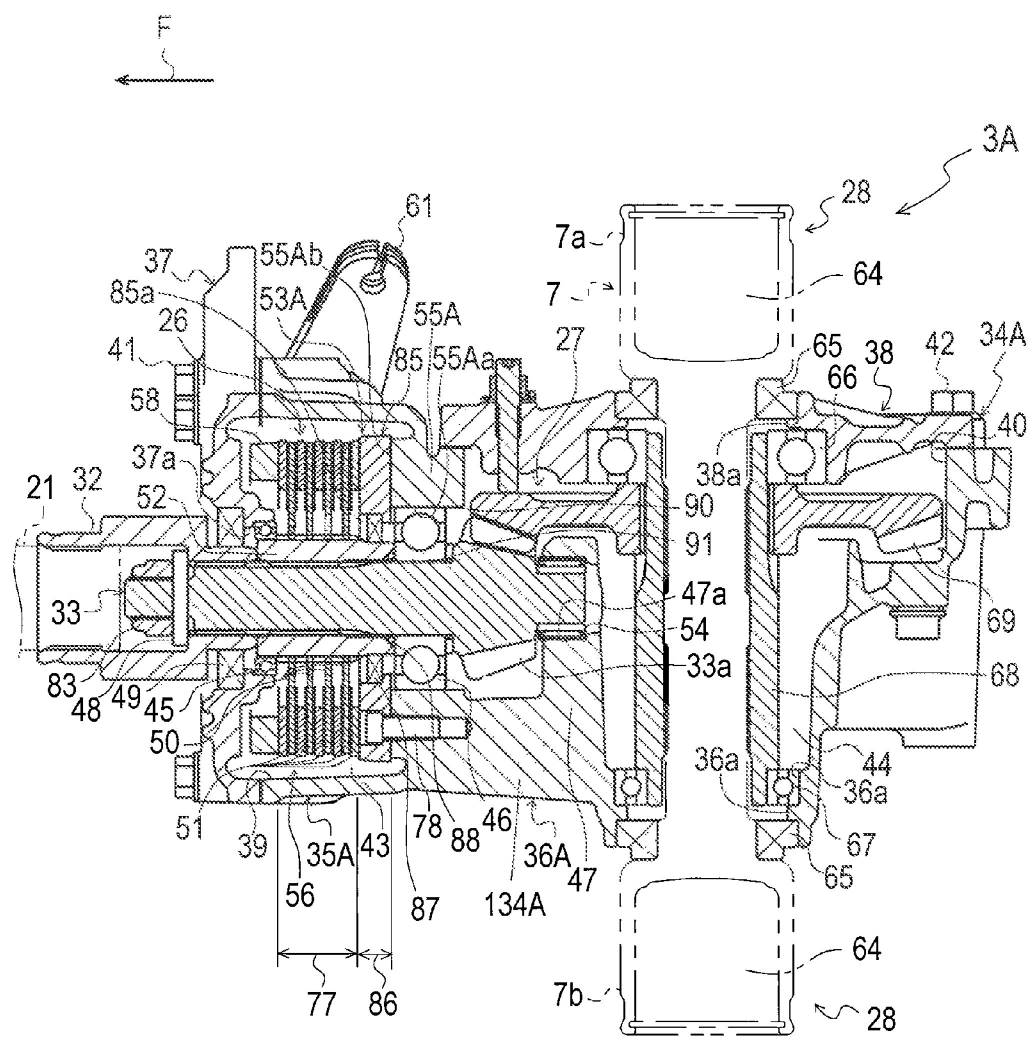
FIG. 11 is a sectional bottom view of the transaxle shown in FIG. 10.

Referring to FIGS. 10 and 11, an alternative rear transaxle 3A equipped with an alternative spacing system 53A will be described on an assumption that its component elements designated by reference numerals having been referred to for description of rear transaxle 3 shown in FIGS. 1 to 9 are identical or similar to those of rear transaxle 3 designated by the same reference numerals, in other words, rear transaxle 3 modified to include alternative spacing system 53A is referred to as rear transaxle 3A.

A main housing 134A, front cover 37 and side cover 38 are joined together so as to constitute a transaxle casing 34A of rear transaxle 3A. The difference of main housing 134A from main housing 134 means the difference of transaxle casing 34A from transaxle casing 34. The difference of main housing 134A from main housing 134 is that main housing 134A is formed with an alternative partition wall 55A between brake chamber 43 and gear chamber 44. Partition wall 55A is bored through with an alternative connection hole 55Aa that is open at a front end thereof to brake chamber 43 and at a rear end thereof to gear chamber 44. Input shaft 33 is passed through connection hole 55Aa, and ball bearing 46 fitted on input shaft 33 is disposed in connection hole 55Aa so as to be directly fitted at the outer peripheral surface thereof to an inner peripheral surface of partition wall 55A defining connection hole 55Aa, in comparison with ball bearing 46 in connection hole 55*a* of partition wall 55 of main housing 134 is fitted at the outer peripheral surface thereof to the inner peripheral surface of rear cylindrical portion 70*b* of bearing holder 70 fitted in connection hole 55*a*.

Partition wall 55A has a vertical front end surface 55Ab defining the rear end of brake chamber 43. To provide a spacer for the gap between vertical front end surface 55Aa of partition wall 55A and rearmost steel disc 51 of layered friction elements 56, a ring-shaped spacer 85 having an axial hole 85*a* is disposed in brake chamber 43 so as to allow input shaft 33 and brake hub sleeve 52 fitted on input shaft 33 to pass through axial hole 85*a*, and so as to abut at a vertical rear end surface thereof against vertical front end surface 55Ab of partition wall 55A. Spacer 85 is a member corresponding to spacer portion 70*a* of bearing holder 70 from which rear cylindrical portion 70*b* is removed. Spacer 85 is fastened to partition wall 55A by at least one bolt 78, so that spacer 85 can easily be detached from transaxle casing 34A, i.e., partition wall 55A of main housing 134A by loosening bolt 78.

In this way, spacing system 53A is configured so that spacer 85 for the gap between layered friction elements 56 and partition wall 55A does not have the function to hold ball bearing 46, and so that partition wall 55A of main housing 134A of transaxle casing 34A holds ball bearing 46 with no additional member.

Also, spacing system 53A is configured so as to use one selected among spacers 85 having different axial thicknesses (i.e., in the axial direction of input shaft 33) in correspondence to respective different axial thicknesses of layered friction elements 56. In other words, spacing system 53A provide a variable spacer suitable to friction element group 56 having a variable axial thickness of layered friction elements 56 by preparing spacers 85 having different axial thicknesses for transaxles including respective multi-disc brakes having different capacities. For example, in the embodiment shown in FIG. 11, layered friction elements 56 of brake 26 consisting of four friction discs 50 and five steel discs 51 has axial thickness 77. Therefore, spacer 85 having an axial thickness 86 is selected for the gap between layered friction elements 56 having axial thickness 77 and partition wall 55A.

In comparison with spacing system 53 that uses bearing holder 70 whose rear cylindrical portion 70*b* with O-ring 71 thereon is interposed between the outer peripheral surface of ball bearing 46 and the inner peripheral surface of partition wall 55, spacing system 53A has no member interposed between the outer peripheral surface of ball bearing 46 and the inner peripheral surface of partition wall 55A, so that fluid can flow between brake chamber 43 and gear chamber 44 through a gap 90 between the outer peripheral surface of ball bearing 46 and the inner peripheral surface of partition wall 55A. If brake chamber 43 and gear chamber 44 are filled with different fluids having different friction coefficients for brake 26 and gear transmission 27, respectively, the flow of fluid through gap 90 may cause a mixture of the different fluids such as to wrongly influence activations of brake 26 and gear transmission 27. Therefore, to isolate gap 90 connected to gear chamber 44 from the fluid immersing layered friction elements 56 in brake chamber 43, a ring-shaped fluid seal 87 is disposed in axial hole 85*a* of spacer 85 so as to be fitted at an inner peripheral surface thereof onto an outer peripheral surface of brake hub sleeve 52 and at an outer peripheral surface thereof to an inner peripheral surface of spacer 85. More specifically, an inner peripheral portion of spacer 85 defining axial hole 85*a* is radially stepped so as to form a vertical surface between a diametrically large front portion of axial hole 85*a* and a diametrically small rear portion of axial hole 85*a*. Fluid seal 87 abuts against the vertical surface of the inner peripheral portion of spacer 85 so as to be located in the front portion of axial hole 85*a* in the longitudinal direction.

Further, fluid can also flow between brake chamber 43 and gear chamber 44 through a gap 91 between the inner peripheral surface of ball bearing 46 and the outer peripheral surface of input shaft 33. Therefore, to isolate gap 91 from a gap between the splined inner peripheral portion of brake hub sleeve 52 and the splined outer peripheral portion of input shaft 33 in brake chamber 43, an O-ring 88 is interposed between an inner peripheral surface of a rear end portion of brake hub sleeve 52 and an outer peripheral surface of input shaft 33.

As mentioned above, each of rear transaxles 3 and 3A has the sure fluid tightness between brake chamber 43 and gear chamber 44, thereby enabling different fluids having different friction coefficients appropriate for proper activations of wet multi-friction disc brake 26 in brake chamber 43 and gear transmission 27 in gear chamber 44 to be used to improve performance of each of rear transaxles 3 and 3A.

Referring to FIG. 10, a vertical vent hole 97A formed in gear housing 36 formed of main housing 134A of transaxle casing 34A is similar to vertical vent hole 97 formed in gear housing 36 formed of main housing 134 of transaxle casing 34, and a breather 95A fitted in a top portion of vertical vent hole 97A is similar to breather 95 fitted in the top portion of vertical vent hole 97.

Each of rear transaxles 3 and 3A may be vertically and laterally reversible so as to correspond to whether input shaft 33 should be rotated clockwise or counterclockwise, thereby correctly directing the rotation of output shaft 7. To ensure such a vertical and lateral reversibility, each of rear transaxles 3 and 3A may be configured so as to use vent hole 97 or 97A and breather 95 or 95A regardless of the vertical and lateral reverse of rear transaxle 3 or 3A. For example, rear transaxle 3 or 3A may be provided with a pair of upper and lower vertical vent holes 97 or 97A formed in gear housing 36 so that upper vent hole 97 or 97A is used for fitting of breather 97 or 97A and lower vent hole 97 or 97A is plugged at a bottom end thereof regardless of the vertical and lateral reverse of rear transaxle 3 or 3A.

Further, each of rear transaxles 3 and 3A is provided with an oiling port and a drain port (not shown), and it may be configured to use the oiling port and the drain port regardless of the vertical and lateral reverse of rear transaxle 3 or 3A. For example, rear transaxle 3 or 3A may be provided with a top-and-bottom open vertical hole through main housing 134 or 134A so that the top and bottom openings of the hole are normally plugged, the top opening is used as the oiling port by removing a plug therefrom, and the bottom opening is used as the drain port by removing another plug therefrom.

Figure 12:
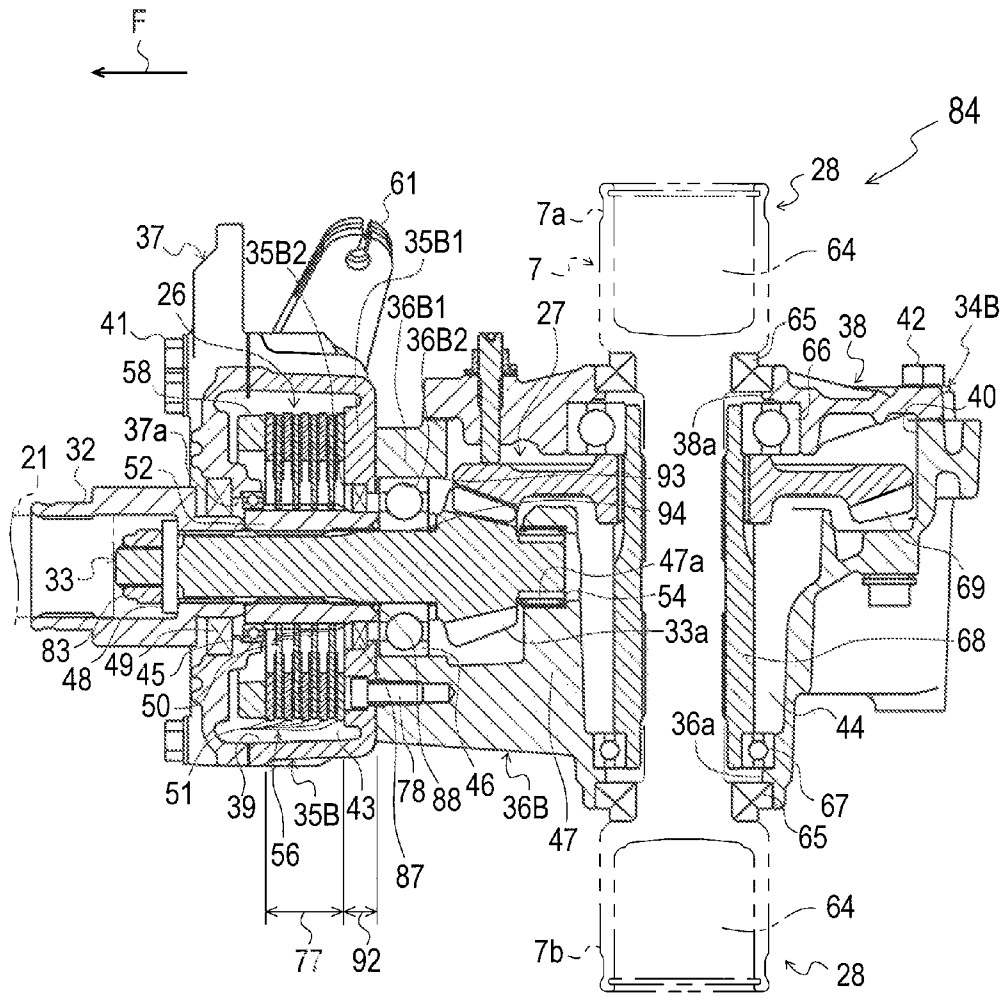
FIG. 12 is a sectional bottom view of another alternative transaxle in which a brake housing is separated from a transmission housing.

Referring to FIG. 12, an alternative rear transaxle 84 will be described on the same assumption as that for the description of rear transaxle 3A compared with rear transaxle 3. A brake housing 35B, a gear housing 36B, front cover 37 and side cover 38 are joined together so as to constitute a transaxle casing 34B of rear transaxle 84. The most significant difference of rear transaxle 84 from rear transaxles 3 and 3A is that rear transaxle 84 uses brake housing 35B and gear housing 36B separated from each other in comparison with each of rear transaxles 3 and 3A that uses main housing 134 or 134A formed integrally with brake housing 35 and gear housing 36.

Front cover 37 is joined to a front open end of brake housing 35B so that front cover 37 and brake housing 35B define brake chamber 43 therein. Brake housing 35B is formed with a vertical rear end wall 35B1 defining the rear end of brake chamber 43. On the other hand, side cover 38 is joined to a right or left open end (in this embodiment, a left open end) of gear housing 36B so that side cover 38 and brake housing 36B define gear chamber 44 therein. Gear housing 36B is formed with a vertical front end wall 35B1 defining the front end of gear chamber 44. A vertical rear end surface of rear end wall 35B1 of brake housing 35B abuts against a vertical front end surface of front end wall 36B1 of gear housing 36B, and at least one bolt 78 is screwed rearward into front end wall 36B1 of gear housing 36B through rear end wall 35B1 of brake housing 35B so as to fasten brake housing 35B to gear housing 36B. By loosening bolt 78, brake housing 35B can be separated from gear housing 36B.

Rear end wall 35B1 is bored through with a longitudinal hole 35B2, and front end wall 36B1 of gear housing 36B is bored through with a longitudinal connection hole 36B2, so that input shaft 33 is passed through holes 35B2 and 36B2 continuing to each other so as to extend longitudinally. Ball bearing 46 is disposed in connection hole 36B2 so as to be fitted at the outer peripheral surface thereof to an inner peripheral surface of front end wall 36B1 defining connection hole 36B2, and so as to be fitted at the inner peripheral surface thereof onto the outer peripheral surface of input shaft 33. Therefore, front end wall 36B1 of gear housing 36B corresponds to partition wall 55A of main housing 134A as shown in FIGS. 10 and 11.

In gear chamber 44 defined by gear housing 36B and side cover 38, the rear end portion of input shaft 33 with bevel pinion **33*a* thereon and output shaft 7 with bevel gear 69 thereon are disposed so as to constitute gear transmission 27 including bevel pinion 33*a* and bevel gear 69** meshing with each other.

In brake chamber 43 defined by gear housing 35B and front cover 37, brake 26 including pressure plate 58 and layered friction elements 56 consisting of friction discs 50 and steel discs 51 is provided on input shaft 33. Vertical rear end wall 35B1 is expanded forward in brake chamber 43 so as to have an axial thickness 92 in the axial direction of input shaft 33. A vertical front end surface of the forwardly expanded portion of rear end wall 35B1 abuts against rearmost steel disc 51, so that the forwardly expanded portion of rear end wall 35B1 serves as a spacer corresponding to brake 26 whose layered friction elements 56 have axial thickness 77.

To adjust a capacity of brake 26, i.e., an axial thickness of layered friction elements 56, different brake housings 35B whose rear end walls 35B1 have different axial thicknesses are prepared so that one including brake 26 whose layered friction elements 56 has an optimal axial thickness can be selected from the group of different brake housings 35B. In this regard, any selected brake housing 35B is formed with rear end wall 35B1 serving as the appropriate spacer for brake 26 including layered friction elements 56 having the optimal axial thickness.

An inner peripheral portion of rear end wall 33B1 defining hole 35B2 is radially stepped so as to form a vertical surface between a diametrically large front portion of hole 35B2 and a diametrically small rear portion of hole 35B2. Ring-shaped fluid seal 87 is disposed in the front portion of hole 35B2 so as to abut against the vertical surface of the stepped inner peripheral portion of rear end wall 35B1. In this way, fluid seal 87 is interposed between brake hub sleeve 52 and rear end wall 35B1 of brake housing 35B so as to be fitted at an inner peripheral surface thereof onto an outer peripheral surface of brake hub sleeve 52, and at an outer peripheral surface thereof to the inner peripheral surface of rear end wall 35B1 defining the front portion of hole 35B2, thereby isolating a gap 93 between the outer peripheral surface of ball bearing 46 and the inner peripheral surface of front end wall 36B1 of gear housing 36B from the fluid immersing layered friction elements 56 in brake chamber 43.

Also, similar to O-ring 88 in rear transaxle 3A, O-ring 88 is interposed between an inner peripheral surface of the rear end portion of brake hub sleeve 52 and the outer peripheral surface of input shaft 33 so as to isolate a gap 94 between the inner peripheral surface of ball bearing 46 and the outer peripheral surface of input shaft 33 from the gap between the splined inner peripheral portion of brake hub sleeve 52 and the splined outer peripheral portion of input shaft 33 in brake chamber 43.

Therefore, rear transaxle 84 has the sure fluid tightness between brake chamber 43 and gear chamber 44, thereby enabling different fluids having different friction coefficients appropriate to be used for proper activations of both wet multi-friction disc brake 26 in brake chamber 43 and gear transmission 27 in gear chamber 44.

It is further understood by those skilled in the art that the foregoing description is given to preferred embodiments of the disclosed apparatus and that various changes and modifications may be made in the invention without departing from the scope thereof defined by the following claims.

What is claimed is:

1. A transaxle, comprising:

an input shaft;

a brake provided on the input shaft, the brake including layered friction elements;

an output shaft;

a mechanical transmission configured to transmit power from the input shaft to the output shaft;

a transaxle casing including a housing, the housing defining both a brake chamber and a transmission chamber, the brake chamber incorporating the brake, and the transmission chamber incorporating the transmission; and a spacing system configured such that the transaxle casing is provided with a partition wall between the brake chamber and the transmission chamber so as to hold a bearing in the partition wall to journal the input shaft, and so as to provide a spacer for the layered friction elements of the brake, the spacer defining a space in the axial direction of the input shaft corresponding to a thickness of the layered friction elements in the axial direction of the input shaft, wherein the housing is formed with the partition wall having an inner peripheral portion defining a hole through which the input shaft is passed between the brake chamber and the transmission chamber, such that the inner peripheral portion of the partition wall holds the bearing disposed in the hole, and wherein the spacing system includes a member serving as the spacer, the member separated from the housing and disposed in the brake chamber between the partition wall and the layered friction elements.

2. The transaxle according to claim 1, wherein the spacing system includes a bearing holder separated from the transaxle casing, wherein the bearing holder includes a cylindrical portion that holds the bearing, and wherein the bearing holder includes a spacer portion disposed in the brake chamber so as to serve as the spacer.

* * * * *